Feb. 5, 1952
E. P. SCHWAB
2,584,625
ANTISKID AND TRACTION APPLIANCE
FOR MOTOR VEHICLE WHEELS
Filed July 17, 1947
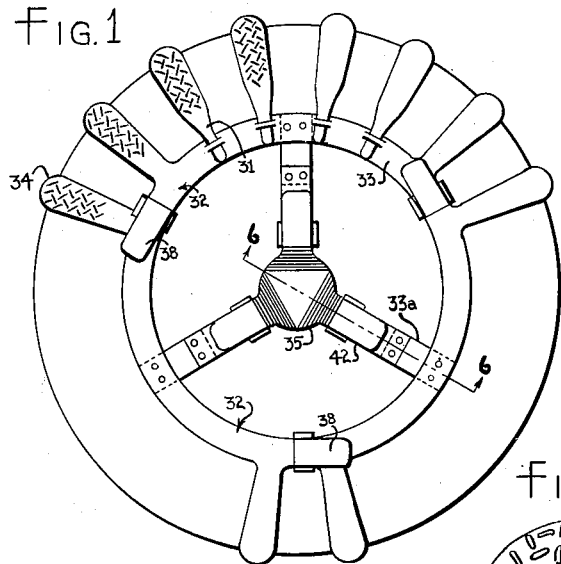
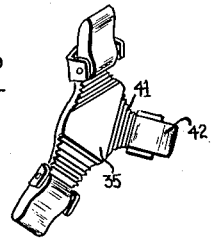
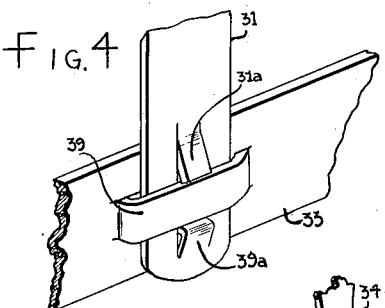
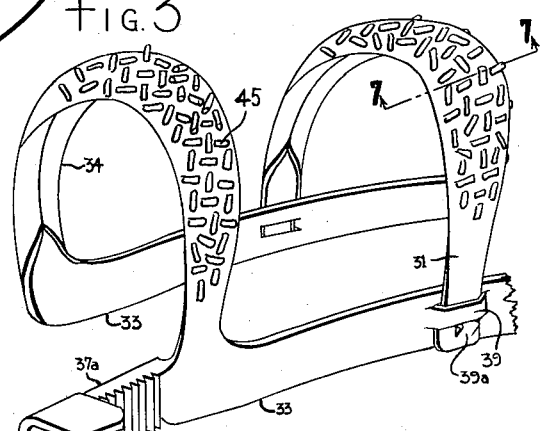
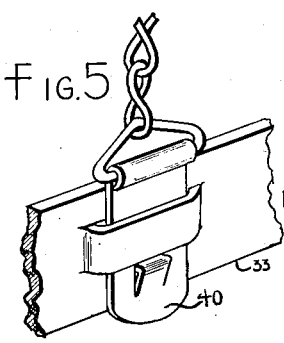
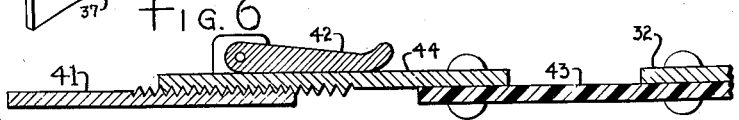
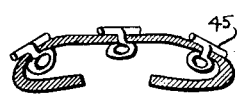
Emil P Schwab
INVENTOR Patented Feb. 5, 1952

2,584,625

UNITED STATES PATENT OFFICE 2,584,625

ANTISKID AND TRACTION APPLIANCE FOR MOTOR VEHICLE WHEELS

Emil P. Schwab, Mount Lebanon, Pittsburgh, Pa.

Application July 17, 1947, Serial No. 761,664

4 Claims. (Cl. 152—226)

The need for an anti-skid and traction device for motor vehicles of present day design, that comprises elements for expeditious attachment, increased traction and the elimination of traction member breakage by use of rigid traction members, is well recognized by those skilled in the art, as well as motorists and commercial motor vehicle operators.

This invention provides such features to meet these requirements and thereby makes available new and useful improvements in traction creating appliances, that contemplate a marked advance over devices presently in use.

These improvements relate to some extent to the type of device illustrated in application filed February 11, 1947, assigned Serial No. 727,888 and now Letters Patent 2,474,696, granted June 28, 1949, and Letters Patent granted June 28, 1941, as No. 2,310,467.

This device is designed to facilitate mounting and detachment, is more practicably applied than the conventional "skid chains" and other contrivances, adapted to mounting on pneumatic tires and similar shaped wheels, including those with unpunctured discs.

Comprising rigid traction members, the undesirable breakage of "cross chains" is eliminated, and the additional surface embodied in this design affords greater traction and resistance to skidding by reason of manifold, concentrated and diagonally and right angle placing of numerous wire elements, providing at least three times the road contact that ordinary skid chains do, by use of the longitudinal convex shaped shell forming the transversely disposed rigid traction member.

While the advantages of ordinary chains are retained, the road surface contact with this device is uniformly even, without the irregularity that occurs with ordinary skid chains, that come in contact with the road only at protruding points, representing a maximum of about twenty-five (25%) per cent of the length of contact links, thereby creating an instability in the operation of vehicles, particularly where there is a marked crown or berm slope on the highway.

The symmetrical arrangement of the traction element in the instant device produces traction and resistance uniformly and with harmonious continuing regularity at wheel turns, at road surface contact points, compared with the incongruous surface contact of the protruding portions of each link in "skid chains." It is therefore conceivable that in use, all or a substantial portion of each of the wire traction elements coming in contact with the highway surface, perform the desired function, which is not true of ordinary chains.

The sectional design permits of the use of rigid traction members, which could not practically be mounted and attached for proper performance on motor vehicles with the type of fenders generally in use, if such rigid traction members were attached to a circular annulus or a semi-circle sectional hinged arrangement. Yet the instant device provides the rigidity of a circular annulus and prevents excessive circumferential movement by the adjustable fastening means.

The impairment of wire elements because of wear, does not require immediate replacement of entire traction member, as is the case with ordinary chains, and vehicle can be operated even though wire elements are worn, offering the advantage of continuing when necessary or desirable without dangling chains or loosening of entire chain skid unit because of the breakage of two or three cross chains, which is not unusual, with ordinary skid chain units.

The anti-skid device being of sectional design, can be expanded radially from a central spider and applied by a person facing the wheel, without any fastening on the inner side of the wheel. No crawling underneath and behind the wheel is necessary. As an example, two of the three circumferentially disposed sections of the three-part unit, attached to central spider member may be mounted, then by allowing the wheel to roll one-third of a revolution, the uncovered portion of the tire will be brought away from the ground, so that the remaining section may be placed and locked with the others in operative position. While there may be several methods that could be used to accomplish this, my preference lies with the radial and circumferential adjustable device incorporated herein.

If it is preferred to use a jack for mounting, the device can be expanded radially and circumferentially, placed over a tire as a unit and then contracted and locked in operating position. It will be observed that the details have been developed to provide for expeditious mounting, fastening and adjustment, as well as detachment from the wheel.

The feature of manual replacement of transversely disposed traction members permits of detachment by merely pressing the spring catch at each end to release, and withdraw, and the replacement member need merely be pushed through the strap provided in the arcuate segments.

Other objects and advantages of the invention will become manifest from the following specification and accompanying drawings wherein:

Figure 1 illustrates a wheel with a form of the device attached to it.

Figure 2 shows in perspective the central adjustable fastening member.

Figure 3 is a fragmentary perspective view showing portions of two frames and interlocking means, with transversely disposed rigid traction members.

Figure 4 is a fragmentary view of arcuate segment showing manual means for fastening rigid traction member.

Figure 5 is a similar view revealing manual means for attaching an alternate cross chain member.

Figure 6 is a longitudinal section taken upon plane of line 6—6, Fig. 1.

Figure 7 is a cross sectional view of transversely disposed traction member taken at line 7—7, Fig. 3.

Figure 8 is a wire element used with arched traction member.

Figure 9 is another type of wire element for alternate use on rigid traction member.

Referring to the drawings wherein like numerals designate like parts, it will be observed that the main elements of the invention are seen in Fig. 1 in their assembled and operative relationship. Numeral 31 denotes traction members corresponding to old fashioned "cross chains." These are carried on a frame generally designated as 32, having two parallel arcuate bars 33 connected by arched members 34, as seen in Figure 3, the latter themselves constituting traction members also. As here shown, three such frames are tied to a centrally located spider 35 by means of radial bands 33a, or alternate bands 43 and 44, Figure 6, in combination.

As seen in Figure 3, the outer bars 33 have projecting ends 37 and 37a, which overlap and are provided with rather finely notched surfaces which can be locked together very securely by means of the eccentric dog 38 in the position they take when the traction members are pulled snugly against the tire. In simpler optional form of this detail, the left hand projection of one bar has a tongue which locks in a recess in the right hand projection of the adjacent bar.

Attention is invited to the elements that are designed to perform the same function as the links of the well known "Weed" cross chains. These consist of pieces 45 of hard wire bent as in Figure 8. The loop portion is inserted through one of the many diagonal slots in the steel arched members 31 and 34, Figure 3, the free ends thus lying against the outer surface of the arched member, and the piece being locked in by swaging the loop, lacing a wire through the loop, welding or otherwise. The individual pieces are thus renewable when necessary. An alternate method of inserting wire elements is to have round holes punched in the upper portion of traction members 31 and 34 and towards the sides, of diameter about the same as that of the wire, then bend ends of small piece or pieces of wire like a staple as 46, Figure 9, push the ends through the holes and clamp them underneath.

As already explained, end members 34, Figure 3, are integral with the sides of the frames, but the equally spaced intervening members 31 are separate and interchangeable. A strap 39, Figures 3 and 4, can be struck up from the bar and the spring catch 39a can be struck up from the end of the arched member. To release the latter, the catch 39a needs only to be pushed in and the member withdrawn. To give clearance for the inner end of the turned-back part of the catch, a slot at right angles to the strap 39 may be cut in the bar. A stop to butt against the upper edge of strap 39 may be provided by striking it up on the face as at 31a, Figure 4, or widening member 31 at that point. In place of the type of traction member described above, a cross chain of more conventional form as in Figure 5 may be substituted, a tab 40 terminating the chain to engage the bar in the same manner as the solid steel arched member.

One of the methods developed for tying the three frames to the central spider consists in the provision of a metal strap fixed at one end to the frame and provided at the other end with a corrugated or serrated surface to engage a complementary surface on the leg 41, Figures 2 and 6, of the three-legged spider. Eccentric dog 42 locks the two pieces together at any position to which they are adjusted. If greater flexibility is desired, an element for that purpose can be inserted between the part riveted to the frame and the part that carries the fastening dog. The member numbered 43 in Figure 6 represents a heavy elastic member arranged in that manner.

Another modification of this mechanism, not here illustrated, consists in the use of a circular disc in place of the spider, three bolts pivoted in three radial slots in the disc, so as to swing out like hinges, and wing nuts on the ends of the bolts. The members represented in Figure 6 are replaced by simple flat metal straps having at one end a hook to engage a slot cut at the middle of each frame 32, Figure 1, and at the other end a key-hole slot through the wider end of which the wing nut can be swung. The locking of the parts is completed by tightening the wing nuts which will then be in line with the narrower parts of the key-hole slots, the bolts being finally perpendicular, of course, to the disc and the straps.

A cross section of the rigid traction members 31 and 34, Figure 3, is shown in Figure 7.

Having described the invention, what is claimed as new is:

1. A rigidly integral, multi-sectional, circumferentially adaptable anti-skid and traction device for a motor vehicle wheel, each section embodying a pair of relatively parallel, arcuate, side bar segments, placed at the inner and outer sides of the wheel, joined at the ends thereof by transversely disposed traction members extending over the periphery of the wheel, their outer surfaces being provided with a multiplicity of wire traction elements forming a meshwork to produce equalization in traction as the wheel revolves; provision for attaching additional traction members to the side bar segments between the ends and complementary, adjustable, interlocking means for fastening the adjoining sections on the outer-side of the wheel, forming a rigidly expansible annulus for expeditious mounting and fastening.

2. A rigidly integral, multi-sectional, circumferentially adaptable anti-skid and traction device for a motor vehicle wheel, each section embodying a pair of relatively parallel, arcuate, side bar segments, with one bar segment placed on the inner and the other on the outer side of the wheel, joined at their respective ends by transversely disposed traction members extending over the periphery of the wheel, the outer surfaces thereof being provided with a meshwork of wire traction elements; side bar segments providing means for attaching additional traction members and means for firmly fastening the device on the outer side of the wheel.

3. An anti-skid and traction appliance for a motor vehicle wheel, embodying at least three elongated frames forming a unit, adapted to be applied to the tread of a tire or wheel, similarly formed and to extend lengthwise, circumferentially thereof, comprising parallel inner and outer arcuate bars in each frame structure, joined near the ends by permanent transversely disposed convex or arched segments, the arcuate bars provided with means for attaching additional rigid convex segments or other interchangeable traction members interspaced between said permanent arched end segments, numerous protuberant wire traction elements covering the outer surface of the arched or convex segments, said outer arcuate bars equipped with complementary extensions providing means for circumferential adjustment and fastening of the frames.

4. An anti-skid and traction appliance for a motor vehicle wheel, as described in claim 3, with additional outer frame interlocking and fastening means, comprising individual legs extending from the outer arcuate bars to a central adjustable fastening member to which such legs are securely attached, to hold the entire device firmly to the wheel.

EMIL P. SCHWAB.

REFERENCES CITED

The following references are of record in the file of this patent:

UNITED STATES PATENTS

| Number | Name | Date |
|---|---|---|
| 1,001,633 | Gaylor | Aug. 29, 1911 |
| 1,099,513 | Panchula | June 9, 1914 |
| 1,101,198 | Lashar | June 23, 1914 |
| 1,115,221 | Lyon | Oct. 27, 1914 |
| 1,142,909 | Purdie | June 15, 1915 |
| 1,466,082 | Baxa | Aug. 28, 1923 |